Aug. 10, 1965  D. H. DIERKSHEIDE  3,199,970
MOUNTING FOR BLANK MOLDS
Filed Feb. 1, 1963  2 Sheets-Sheet 1
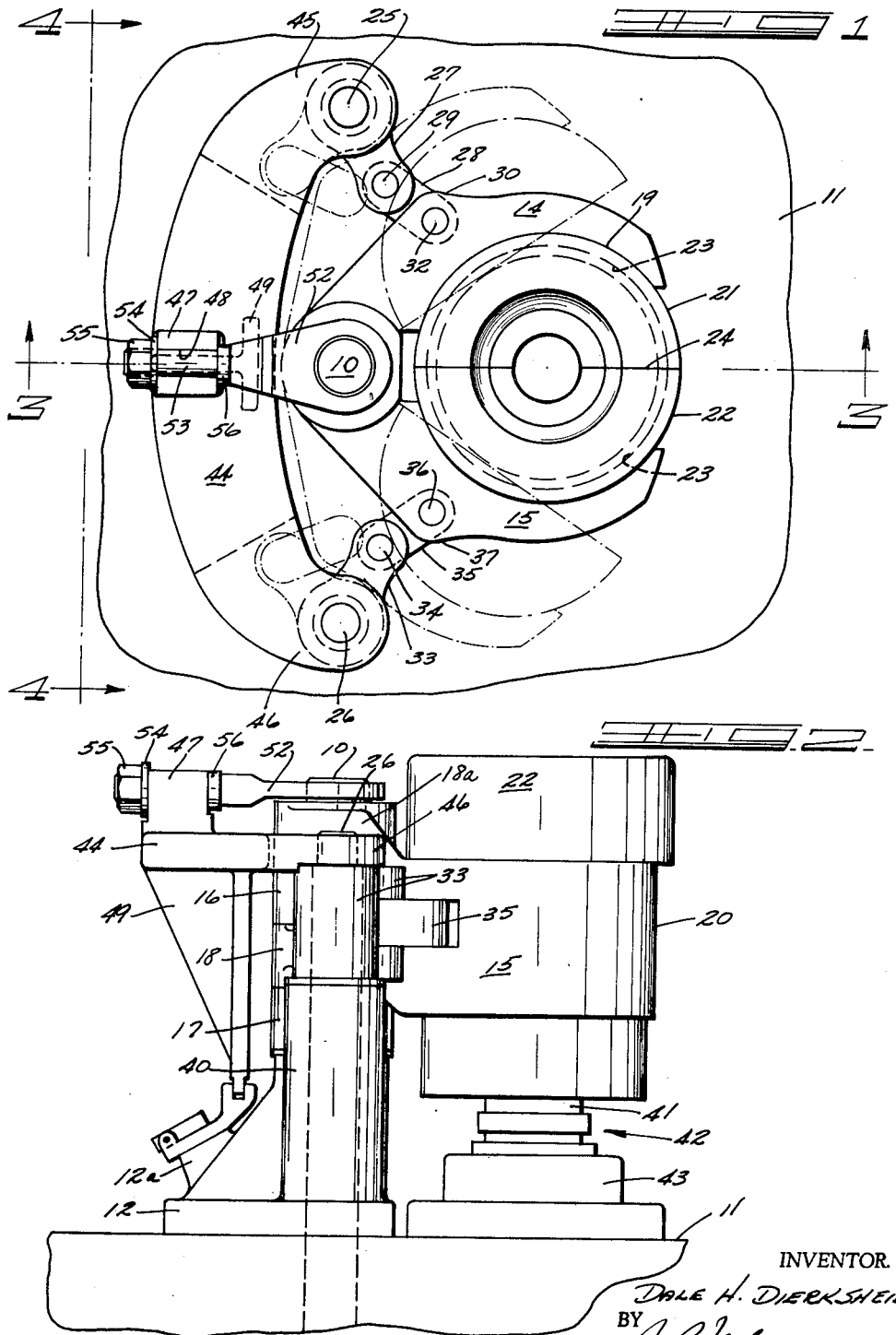
INVENTOR.
DALE H. DIERKSHEIDE
BY
J. R. Nelson and
W. A. Schaich
ATTORNEYS

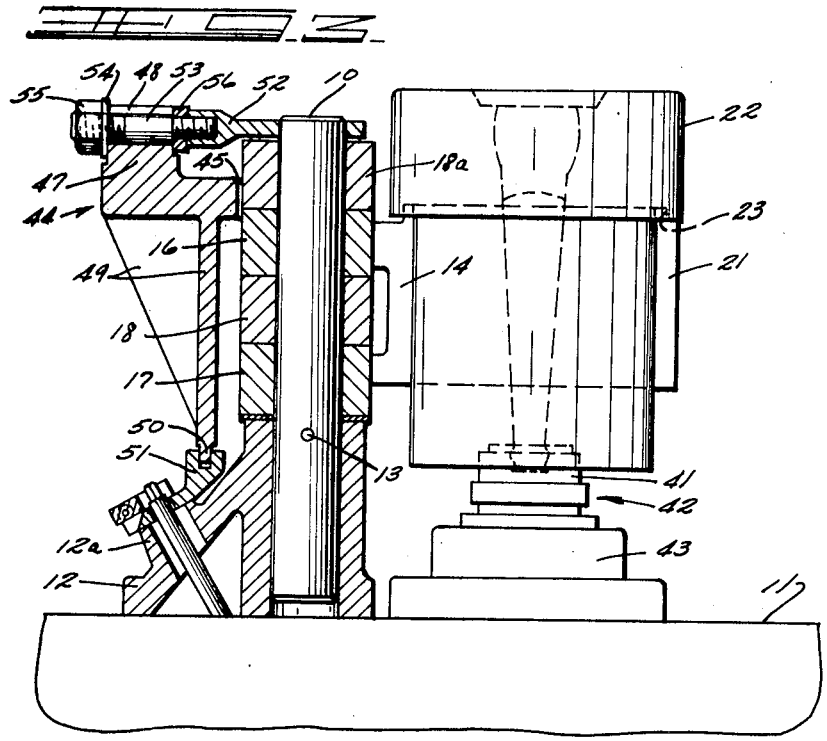
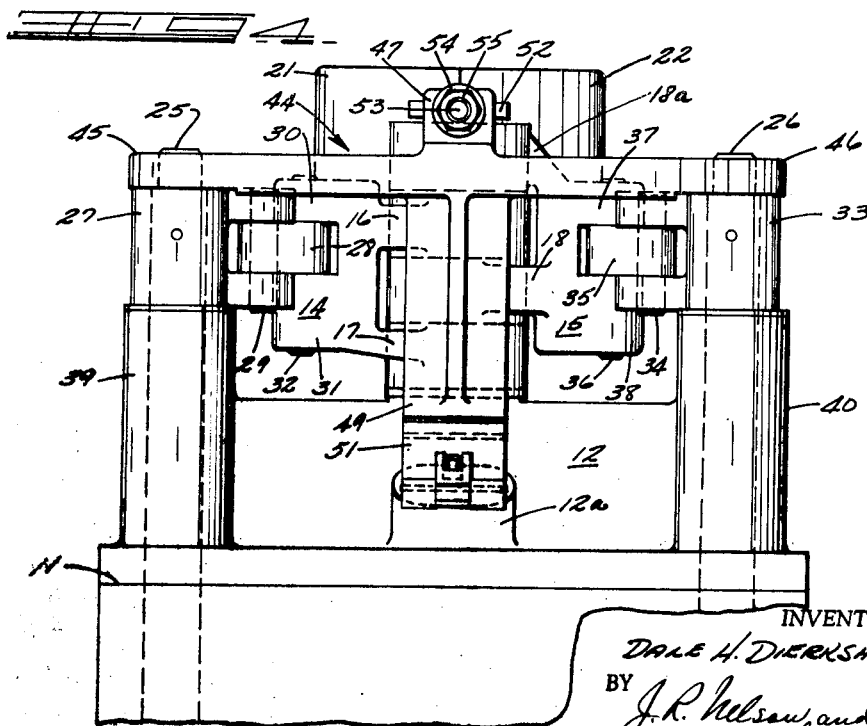

United States Patent Office 3,199,970
Patented Aug. 10, 1965

3,199,970
MOUNTING FOR BLANK MOLDS
Dale H. Dierksheide, Perrysburg, Ohio, assignor to Owens-Illinois Glass Company, a corporation of Ohio
Filed Feb. 1, 1963, Ser. No. 255,541
6 Claims. (Cl. 65—360)

The present invention relates to a mounting and operating means for a blank mold unit on a glassware forming machine, and more particularly to such a mounting as will reduce or substantially eliminate deflections of the mold members during their operation in movement to a closed molding position.

The conventional mold mounting, as employed for examples on an I.S. type glassware forming machine, utilizes a center post or shaft upon which a pair of scissors arms are journal mounted for driving them toward and away from the mold closed position. Complementary partible blank mold sections are mounted on these scissors arms and they are made to close about a pair of neck mold sections carried on an invert arm which are in turn made to close on a guide ring located at the molding position. The closed blank and neck mold combinations have opposite end openings, the upper opening providing for loading or charging the mold with a quantity of workable glass, and the lower opening receiving an inserted neck pin or plunger. In moving the blank mold sections to close on the neck mold, the present mechanism experiences a deflection that occurs on the center post mounting for the scissors arms. This deflection will create improper registry between the blank mold and the neck mold, and the present invention has for one of its objects the substantial elimination of this deflection to obviate the problem of proper registry of these parts.

Another object of the invention is to provide a mold mounting of the general type described, wherein the bearings of the mold carriage are preloaded.

A further object of the invention is the provision of additional upper center post support for the blank mold carriage, and a reduction in bearing loads by providing additional bearing on the operating shaft.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a plan view of a blank mold unit of a glassware forming machine which incorporates the present invention.

FIG. 2 is a side elevational view of the blank mold unit shown on FIG. 1.

FIG. 3 is a sectional elevational view taken along line 3—3 on FIG. 1.

FIG. 4 is a rear elevational view taken on line 4—4 of FIG. 1.

In essence the invention comprises a bracket mounted on the blank mold closing operating shafts that are connected by linkages to operate the scissors arms. These shafts include bearings between them and the bracket. The bracket is arched to mount behind the mold center post whereon the scissors arms are hinged. A slotted pad is located on the bracket directly behind the center post. An eye-bolt and journal drops over the upper end of the center post and into the slot on the pad on the bracket. By tightening the eye-bolt, the center post is drawn to the rearward direction and thereby preloading the bearings on the operating shafts. This holds the center post in position when force is applied to the operating shafts. This construction will be apparent from the following description of the drawings, referred to above, which is given as the best mode contemplated at present for carrying out the invention. The description is by way of an example of the invention, and is not intended to limit the invention specifically thereto.

Referring to the drawings, a vertical blank mold center post 10 is supported on a base or frame 11 of a glassware forming machine, such as the known Hartford-Empire I.S. (Individual Section) machine. The post 10 is fastened in a bracket casting 12 on the base 11, such as by pin 13 (FIG. 3). On the upper intermediate part of post 10 are journaled a pair of scissors arms 14 and 15. The arm 14 has upper and lower journal bosses 16 and 17 that fits over post 10. Arm 15 has lower and upper journal bosses 18 and 18a that alternate between bosses 16 and 17 and fit on post 10. Arms 14 and 15 have complementary arcuate holders 19 and 20 which face each other. Complementary blank mold half-sections 21 and 22 each have a flange and groove 23 which fit over the top side of holders 19 or 20. In this manner, the sections 21 and 22 of the blank mold are supported on their carriage for movement on the scissors arm 14 and 15 toward and away from a closed position along parting line (mold seam) 24. The scissors arms 14 and 15 are respectively connected to operating shafts 25 and 26 for pivoting them on center post 10. This connection for arm 14 comprises a journaled link 27 that is keyed onto shaft 25 for pivotal movement therewith. Link 27 is attached to link 28 by pin 29 and link 28 is connected to arm 14 at its spaced bosses 30 and 31 by pin 32. Arm 15 is similarly connected by journaled link 33 keyed on shaft 26, pin 34, link 35 and pin 36 connecting the latter to spaced bosses 37 and 38 on arm 15. The operating shafts 25 and 26 are vertically mounted, respectively, in their bearings 39 and 40 of casting 12 securely fastened on base 11. These shafts 25 and 26 extend downwardly into base 11 and their lower ends (not shown) are each splined to receive a bell crank and linkage. The linkages of each are connected to opposite ends of a pivotal double throw crank that is connected to an air motor. Reciprocating the air motor will cause counter rotation of the shafts 25 and 26 in either direction to drive the scissors arms 14 and 15 toward or away from each other. Thusly, the blank mold sections 21 and 22 are moved into and from a closed position along parting line 24 (FIG. 1).

In closing the blank mold sections 21 and 22, they encompass the underlying neck rings 41 which close on and align with a guide ring and thimble unit 42 of the lowermost plunger unit 43 mounted on the base 11.

With the foregoing description as background for the present invention, the following described improvement is provided.

An arched bracket 44 is journaled over the upper reduced ends of the opening shafts 25 and 26 so as to span between them at the back side of post 10. The connection of the bracket is made at the bored ears 45 and 46. The bracket 44 has an upstanding slotted pad 47 slotted at 48. Bracket 44 also has a central downwardly extending, dependent leg or brace 49 that terminates in a tongue 50. Tongue 50 fits in a slot of an upturned bracket 51 fastened at the back of casting 12 at the point of the plunger cylinder height adjustment latch bracket 12a. An eye-bolt member 52 is bored at one end to fit over the top of the center post 10 and extends rearwardly. Eye-bolt 52 has a threaded member 53 which extends through the slot 48 of pad 47 on the bracket. A washer 54 and tightening nut 55 engages the outer end of threaded part 53 for taking up the eye-bolt and drawing it tight and toward the pad 47 of bracket 44.

This construction provides a means for applying a load force onto the post 10 in a rearward direction away from and opposite the direction of normal deflection of the post during movement of the mold sections and scissors arms in operating the glass molding assembly. The tightening of the nut 55 draws the eye-bolt toward the pad 47, but the predetermined amount of the loading placed on post 10 may be achieved by an annular shim 56 of accurate preselected axial dimension that is placed over the bolt 53 and inserted between pad 47 and eye-bolt 52. Nut 55 may now be drawn tightly without exerting excessively preloading on the mechanism, and this shim determines the desired preload needed. Shim 56 thus allows the desired amount of preload on post 10 and once shim 56 seats firmly against pad 47 the eye-bolt 52 will be drawn up to further, because added tightening of nut 55 only serves to tighten the bolt 53 in the pad 47.

While embodiments of the present invention have been herein specifically described, other embodiments and variations may occur to those skilled in the art after a knowledge of the disclosure herein and it is desired to include within the scope of the patent granted hereon all such embodiments and variations, and more particularly as comprehended by the appended claims.

I claim:

1. A glass forming mold assembly comprising a frame, a center pivot post on said frame, mold arms pivotally supported on said post, means supported by said frame and connected to said arms for pivoting them toward and away from each other at one side of said post which includes a pair of parallel operating shafts spaced from said post and linkages fastened to said shafts for movement therewith and connected to said mold arms, and means connected to said post and said mold arm pivoting means applying a predetermined load force between said post and said pivot shafts, thereby preloading the assembly to prevent deflection thereof by forces exerted in moving the mold arms toward each other on said one side of post.

2. The mold assembly defined in claim 1, wherein the means for applying said load force comprises a bracket member connected to each operating shaft and extending across said other side of said post, a threaded member journaled over said post and inserted in said bracket member opposite said post, said threaded member having a tightening nut applying a load to said center post drawing it toward said bracket member.

3. The mold assembly defined in claim 2, wherein the bracket member is also connected to said frame.

4. The mold assembly defined in claim 2, wherein the predetermined load force is applied by having a spacing shim of preselected thickness between said threaded member and said bracket member, the tightening nut drawing said shim into engagement with said bracket member, thereby providing said predetermined preloading of the center post.

5. A glass forming mold assembly comprising a frame, a center pivot post on said frame, mold arms pivotally supported on said post, a pair of operating shafts rotatably mounted on said frame on opposite sides of said post, linkages on each said shaft and connected to the mold arms, the operating shafts being adapted to pivot and move the mold arms toward and away from each other at one side of said post, a bracket mounted on said operating shafts and extending across the opposite side of said post, a slotted pad on said bracket in line with said post, an eye-bolt journaled on said post and extending through said slot on the pad of said bracket, an annular shim on the eye-bolt intermediate it and said pad, and means applying a predetermined load force between said pivot post and said pair of operating shafts comprising a tightening nut on the outer end of the eye-bolt drawing the latter onto said pad and tightly seating said shim, whereby said predetermined preloading force is opposing forces exerted in the pivot post tending to deflect the latter in moving the mold arms.

6. The mold assembly defined in claim 5, where the bracket includes a dependent center leg thereon connected to said frame for absorbing torsional forces exerted on the bracket.

References Cited by the Examiner
UNITED STATES PATENTS

| | | | |
|---|---|---|---|
| 787,050 | 4/05 | Miller | 65—360 X |
| 2,036,333 | 4/36 | Howard | 65—369 X |
| 2,538,822 | 1/51 | Winder | 65—371 X |

DONALL H. SYLVESTER, *Primary Examiner.*